United States Patent [19]
Kurita et al.

[11] Patent Number: 5,695,031
[45] Date of Patent: Dec. 9, 1997

[54] ONE-WAY CLUTCH

[75] Inventors: Masahiro Kurita, Kuwana; Hirofumi Miyata, Sennan, both of Japan

[73] Assignees: NTN Corporation, Osaka; Bamdo Chemical Industries, Ltd., Kobe, both of Japan

[21] Appl. No.: 670,603

[22] Filed: Jun. 26, 1996

[51] Int. Cl.$^6$ .................................................. F16D 41/067
[52] U.S. Cl. .......................................... 192/45; 188/82.84
[58] Field of Search ........................... 192/45, 44, 38, 192/52.1, 52.2; 188/82.84

[56]            References Cited

U.S. PATENT DOCUMENTS

| | | | |
|---|---|---|---|
| 3,972,573 | 8/1976 | Marola | 192/45 X |
| 4,878,569 | 11/1989 | Schaeffler | 192/45 |
| 4,915,201 | 4/1990 | Stark et al. | 192/45 |
| 5,279,400 | 1/1994 | Riggle et al. | 192/45 |

*Primary Examiner*—Richard M. Lorence
*Attorney, Agent, or Firm*—Wenderoth, Lind & Ponack

[57]              ABSTRACT

A one-way clutch operates stably even while an engine is revolving at a speed that tends to resonate the springs of the clutch. The clutch has an outer ring formed with a plurality of cam surfaces on its inner periphery at equal intervals in the circumferential direction. An inner ring mounted in the outer ring has a cylindrical outer surface that faces the cam surfaces. Wedge-like spaces are defined between the cam surfaces an the cylindrical outer surface. Rollers and springs are mounted in the wedge-like spaces so that the rollers are biased by the springs toward narrower ends of the wedge-like spaces. The springs are made up of at least two different kinds of springs having different spring constants. Thus, even if one of at least two kinds of springs should resonate, the other springs will reliably keep the rollers locked between the cam surfaces and the cylindrical surface or move them to unlocked position. The life of the clutch is thus increased.

1 Claim, 3 Drawing Sheets

ONE-WAY CLUTCH

BACKGROUND OF THE INVENTION

This invention relates to a one-way clutch for transmitting only the rotation of a driving member in one direction to a driven member.

An internal combustion engine produces driving energy only during the combustion stroke. That is, no driving energy is produced during the other strokes. Thus, the angular velocity of the crankshaft varies while it rotates once.

To reduce such variation in angular velocity, its inertia is increased by providing the crankshaft with a flywheel.

But it is impossible to completely eliminate such variation in angular velocity because the torsional strength of the crankshaft places a limit in increasing its inertia. Such variation in angular velocity is especially large in a diesel engine when compared to a gasoline engine. At a low speed range, the variation in angular velocity can reach up to ±20%.

When an engine auxiliary such as an alternator is driven by a crankshaft, whose angular velocity is fluctuating minutely, through a belt drive device, slip will occur between the belt and the pulley because the auxiliary has a stronger tendency to rotate at a constant speed due to its large inertia. The belt is thus worn quickly.

To solve this problem, Unexamined Japanese Patent Publication 61-228153 proposes a belt drive device as shown in FIG. 4. This device comprises a pulley 21 mounted on a crankshaft 20, a pulley 24 mounted on a rotary shaft 23 of an engine auxiliary 22, a belt 25 coupling the pulleys 21 and 24, and a one-way clutch 26 mounted between the rotary shaft 23 and the pulley 24. While the angular velocity of the crankshaft 20 is increasing, it rotation is transmitted to the rotary shaft 23. While the angular velocity is decreasing, its rotation is not transmitted to the rotary shaft 23.

More specifically, while the angular velocity of the crankshaft 20 is increasing, the one-way clutch 26 is adapted to engage, coupling the rotary shaft 23 of the engine auxiliary 22 to the pulley 21. Rotation of the crankshaft 20 is thus transmitted to the rotary shaft 23. When the rotary shaft 23 begins to rotate faster than the pulley 24, the one-way clutch 26 disengages, allowing the rotary shaft 23 to freewheel. Slip will thus never occur between the pulley 24 and the belt 25. The life of the belt 25 extends.

One conventional one-way clutch of this type used in a belt drive device is a roller type clutch comprising an outer ring having a plurality of cam surfaces on its inner periphery, an inner ring having a cylindrical outer surface, rollers mounted in wedge-like spaces defined by the cam surfaces and the cylindrical outer surface, and springs mounted in the wedge-like spaces and biasing the rollers toward the narrower ends of the wedge-like spaces.

The springs are usually leaf springs.

When such a roller type one-way clutch was used in the belt drive device shown in FIG. 4, it did not operate accurately when the engine revolving speed increased to 4000 rpm and over. More specifically, while the angular velocity of the crankshaft was increasing, the one-way clutch sometimes disengages. Such off-states occur several times continuously.

This is because the frequency of variations in angular velocity, which is proportional to the engine revolving speed, coincides with the natural frequency of the springs of the one-way clutch when the engine revolving speed is at a certain point in a high-speed range. If this happens, the springs resonate and their movements become unstable.

If the one-way clutch disengages several times, the revolving speed of the rotary shaft of the engine auxiliary will drop gradually. When the one-way clutch engages subsequently, the rollers will violently collide with and bite into the cam surfaces of the outer ring and the cylindrical surface of the inner ring, thus markedly shortening the life of the one-way clutch.

SUMMARY OF THE INVENTION

An object of this invention is to provide a one-way clutch which operates stably even while the engine is revolving at a speed that tends to resonate the springs of the clutch.

According to this invention, there is provided a one-way clutch comprising an outer ring having a plurality of cam surfaces formed on the inner periphery thereof, an inner ring mounted in the outer ring and having a cylindrical outer surface facing the cam surfaces to define wedge-like spaces between the cam surfaces and the cylindrical surface rolling elements mounted in the wedge-like spaces, while being arranged circumferentially between the outer ring and inner ring, and springs mounted in the wedge-like spaces and biasing the rolling elements toward narrower ends of the wedge-like spaces. The springs a made up of at least two different kinds of springs having different spring constants.

Since two or more kinds of springs having different spring constants are used, they have at least two different resonance points. Thus, even if one of two or more kinds of springs should resonate when the engine revolving speed reaches a certain point, the remaining springs will not resonate because they have different resonance frequencies. Thus, the springs that are not resonating will move the rolling elements reliable into locked position.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
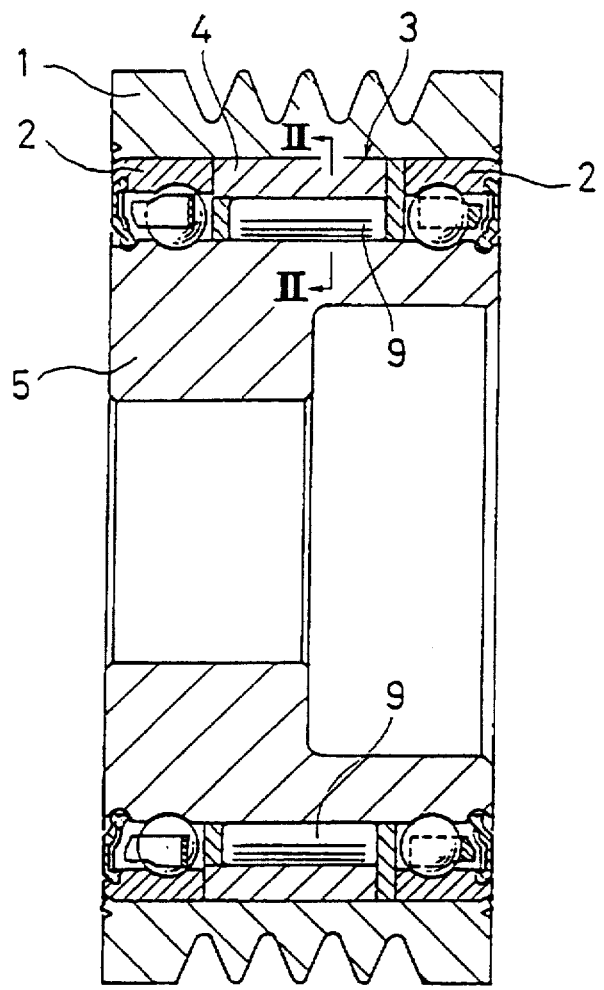
FIG. 1 is a vertical sectional front view of a pulley unit including the one-way clutch according to this invention.

Now the embodiment of this invention is described with reference to FIGS. 1 to 3, which show a pulley unit with a built-in one-way clutch which is to be mounted on a rotary shaft of an engine auxiliary. The pulley unit comprises a pulley 1, a pair of rolling bearings 2 mounted in the pulley 1, and a one-way clutch 3 disposed between the rolling bearings 2.

The one-way clutch 3 has an outer ring 4 press-fitted in the pulley 1, and an inner ring 5 which is a common inner ring for the clutch 3 and the rolling bearings 2.

The outer ring 4 has on its inner periphery a plurality of cam surfaces 6 arranged at circumferentially equal intervals. A wedge-like space 8 is defined between each cam surface 6 and a cylindrical outer surface 7 of the inner ring 5. A rolling element 9 and a spring 10 are mounted in each wedge-like space 6 so that the rolling element 9 is urged by the spring 10 toward the narrower end of the space 8.

The rolling elements 9 and the springs 10 are received in pockets 12 formed in a cage 11 mounted between the outer ring 4 and the inner ring 5. The cage 11 is unrotatable relative to the outer ring 4.

The springs 10 consist of several different kinds of springs having different spring constants. In the embodiment, the springs consist of two kinds of springs 10a and 10b arranged alternately with each other in the circumferential direction of the cage 11.

Figure 4:
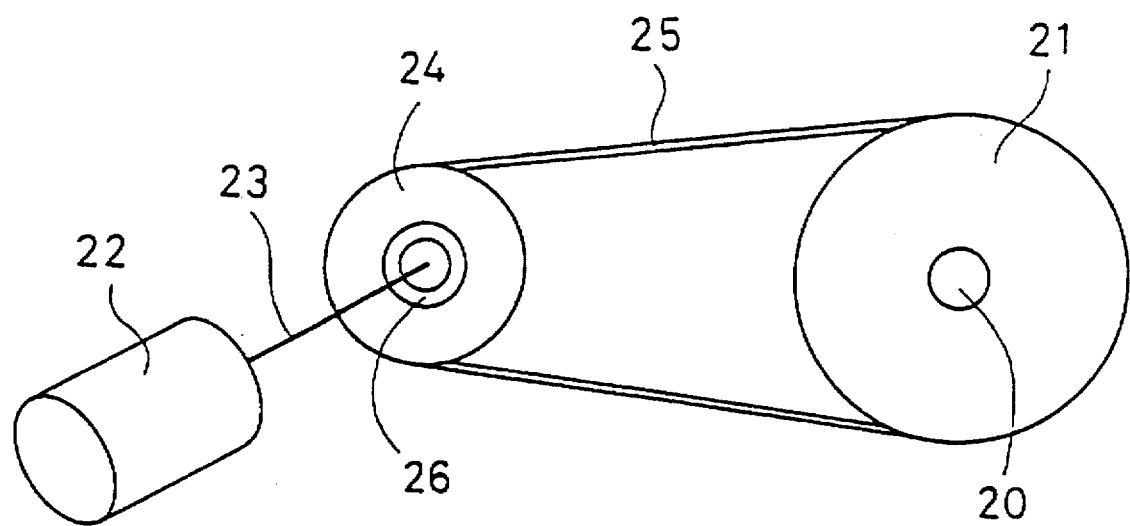
FIG. 4 is a schematic view of a belt driving device for driving an engine auxiliary.

In the embodiment, the pulley unit is mounted on a rotary shaft 23 of an engine auxiliary 22 shown in FIG. 4, while its pulley 1 is coupled to a pulley 21 of a crankshaft 20 through a belt 25. When the engine is activated in this state, rotation of the crankshaft 20 is transmitted to the pulley 1.

Due to minute fluctuations in the angular velocity of the crankshaft 20, the angular velocity of the pulley 1 also fluctuates. While the angular velocity of the pulley 1 is increasing, the rolling elements 9 engage the cam surfaces 6 of the outer ring 4 and the cylindrical outer surface 7 of the inner ring 5, so that the rotation of the pulley 1 is transmitted to the rotary shaft 23.

When the angular velocity of the pulley 1 decreases and the rotary shaft 23 begins to rotate faster than the pulley 1, the rolling elements 9 move toward the wider ends of the wedge-like spaces 8. The clutch thus disengages, allowing the rotary shaft 23 to freewheel relative to the pulley 1, so that no slip occurs between the pulley 1 and the belt 25. Wear on the belt 25 is thus avoided.

We prepared ten pulley units with a built-in one-way clutch in which are mounted 24 springs each with a spring load of 100 gf (comparative examples), and ten pulley units with a built-in one-way clutch in which are mounted 12 first springs each having a spring load of 100 gf and 12 second springs having a spring load of 140 gf and arranged circumferentially alternating with the first springs samples according to the invention). The pulley 1 of each of these pulley units was rotated in both directions at a torsional vibration frequency of 150 Hz while applying a braking force of 0.1 kgf-m to its inner ring 5 to measure its life.

The torsional vibration frequency of 150 Hz corresponds to 4500 rpm on a four-cylinder, four-cycle engine.

The average life of the one-way clutches according to the present invention was 650 hours, whereas that of the one-way clutches of the comparative examples was merely 100 hours.

The reason why the one-way clutch according to the present invention showed such a long life is because at least one of the two kind of springs never resonate, even if the other kinds of springs resonate. Thus, the springs that do not resonate can move the rolling elements 9 to their locked and unlocked positions with high reliability.

By using two different kinds of springs 10a and 10b having different resonance points, at least one of two kinds of springs are always kept from resonating, so that the rolling elements 9 can be moved reliably to their locked and unlocked positions by the springs that are not resonating. Thus, no impulsive wedging of the rolling elements 9 will occur.

Figure 2:
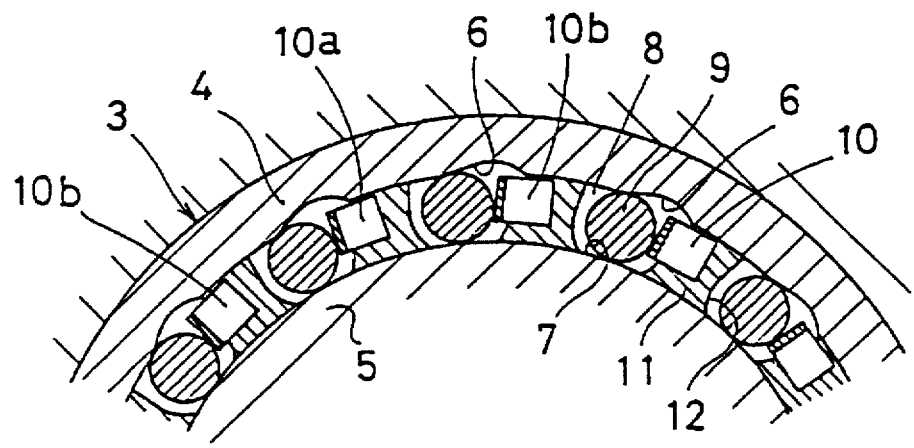
FIG. 2 is a sectional view taken along line II—II of FIG. 1.
Figure 3:
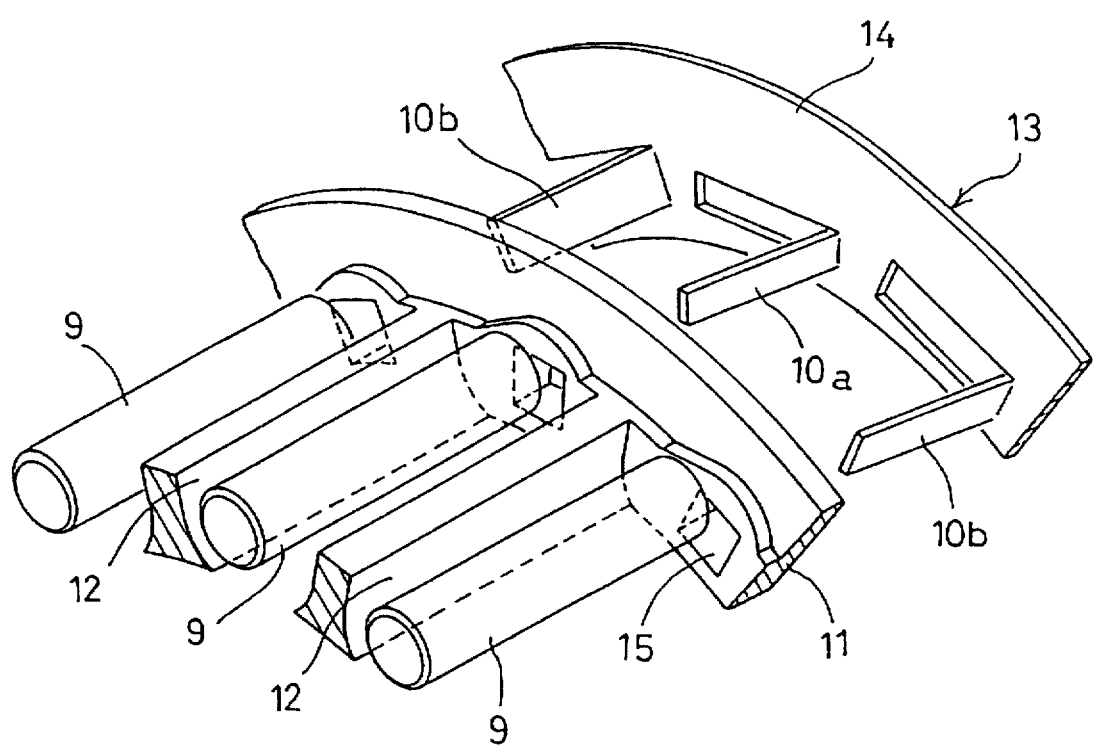
FIG. 3 is an exploded perspective view of different springs.

In the embodiment shown in FIGS. 1 and 2, rollers are used as the rolling elements 9. But they may also be balls.

Also, in the embodiment, the springs 10a and 10b are leaf springs. But they may be coil springs, or may be a spring member 13 as shown in FIG. 3.

That is, two different kinds of springs 10a and 10b are formed, alternating one by one with each other by cutting the spring member 13 and raising the tab-like portions formed by cutting.

In order for the two kinds of springs 10a and 10b to have different spring constants, they have different widths. But for this purpose, they may have different shapes.

To mount the spring member 13 in a one-way clutch, an annular plate 14 is superposed on one side of the cage 11, and then the springs 10a and 10b are inserted through windows 15 formed in the side of the cage 11 into the pockets 12 of the cage 11 to bias the rolling elements 9 toward the narrower ends of the wedge-like spaces 8.

In each embodiment, two different kinds of springs are arranged alternately one by one. But they may arranged alternately two by two or three by three. If three or more kinds of springs are used, they may be arranged at random. Otherwise, they may be arranged alternately, or a plurality of each of three kinds of springs may be arranged at random.

What is claimed is:

1. A one-way clutch comprising an outer ring having a plurality of cam surfaces formed on the inner periphery thereof, an inner ring mounted in said outer ring and having a cylindrical outer surface so that wedge-like spaces are defined between said cam surfaces and said cylindrical surface, rolling elements mounted in said wedge-like spaces and arranged circumferentially between said outer ring and said inner ring, and springs mounted in said wedge-like spaces for biasing said rolling elements toward narrower ends of said wedge-like spaces, said springs comprising springs having at least two different spring constants.

* * * * *